US011604080B2

United States Patent
Paoletti et al.

(10) Patent No.: US 11,604,080 B2
(45) Date of Patent: Mar. 14, 2023

(54) NAVIGATION SYSTEM WITH AN ADAPTIVE MAP PRE-CACHING MECHANISM AND METHOD OF OPERATION THEREOF

(71) Applicant: TeleNav, Inc., Santa Clara, CA (US)

(72) Inventors: Giovanni Paoletti, Los Gatos, CA (US); Kok Wei Koh, Mountain View, CA (US); Eric Wood, Menlo Park, CA (US)

(73) Assignee: Telenav, Inc., Santa Clara, CA (US)

( * ) Notice: Subject to any disclaimer, the term of this patent is extended or adjusted under 35 U.S.C. 154(b) by 223 days.

(21) Appl. No.: 16/725,818

(22) Filed: Dec. 23, 2019

(65) Prior Publication Data

US 2020/0217670 A1 Jul. 9, 2020

Related U.S. Application Data

(60) Provisional application No. 62/788,784, filed on Jan. 5, 2019.

(51) Int. Cl.
*G01C 21/00* (2006.01)

(52) U.S. Cl.
CPC ..... *G01C 21/3881* (2020.08); *G01C 21/3889* (2020.08); *G01C 21/3896* (2020.08)

(58) Field of Classification Search
CPC . G01C 21/32; G01C 21/3889; G01C 21/3881
See application file for complete search history.

(56) References Cited

U.S. PATENT DOCUMENTS

| | | | |
|---|---|---|---|
| 8,103,441 B2 | 1/2012 | Callaghan et al. | |
| 9,222,787 B2 | 12/2015 | Blumenberg et al. | |
| 9,671,234 B2 | 6/2017 | Blumenberg et al. | |
| 10,630,803 B2 * | 4/2020 | Hwang | G01C 21/3461 |
| 2004/0160441 A1 * | 8/2004 | Lokovic | G06T 15/06 |
| | | | 345/426 |
| 2009/0326810 A1 | 12/2009 | Callaghan et al. | |
| 2010/0153007 A1 * | 6/2010 | Crowley | G01C 21/3484 |
| | | | 701/467 |
| 2013/0117322 A1 * | 5/2013 | Fischer | G01C 21/3881 |
| | | | 707/792 |
| 2013/0321424 A1 * | 12/2013 | Pylappan | G06T 3/40 |
| | | | 345/440 |
| 2013/0325326 A1 | 12/2013 | Blumenberg et al. | |
| 2014/0199980 A1 * | 7/2014 | Rao | H04W 4/18 |
| | | | 455/418 |

(Continued)

*Primary Examiner* — Rami Khatib

(74) *Attorney, Agent, or Firm* — Perspectives Law Group, Corp.

(57) ABSTRACT

A system and method of operation of a computing system comprising: receiving a current location; determining a travel path based on the current location; determining a directionality along the travel path while in a free drive navigation mode; predicting a connectivity area based on the directionality; generating map information for a connectivity segment in the connectivity area with a low connectivity; and communicating the map information for storing onto a device for displaying when the connectivity segment is at a surrounding geographic adjacent area relative to the current location and while in the free drive navigation mode.

17 Claims, 6 Drawing Sheets

(56) References Cited

U.S. PATENT DOCUMENTS

| | | | |
|---|---|---|---|
| 2014/0200038 A1* | 7/2014 | Rao | G01C 21/32 |
| | | | 455/457 |
| 2014/0297177 A1* | 10/2014 | den Otter | G01C 21/06 |
| | | | 701/494 |
| 2016/0252358 A1* | 9/2016 | Blumenberg | G01C 21/32 |
| | | | 701/420 |
| 2017/0013406 A1* | 1/2017 | Oliver | H04L 65/608 |
| 2017/0153115 A1* | 6/2017 | Vandanapu | G01C 21/362 |
| 2018/0007161 A1* | 1/2018 | Hwang | H04L 67/12 |
| 2020/0042455 A1* | 2/2020 | Cho | G06F 3/0604 |
| 2020/0225666 A1* | 7/2020 | Lee | G01C 21/367 |

* cited by examiner

NAVIGATION SYSTEM WITH AN ADAPTIVE MAP PRE-CACHING MECHANISM AND METHOD OF OPERATION THEREOF

CROSS-REFERENCE TO RELATED APPLICATION(S)

This application claims the benefit of U.S. Provisional Patent Application Ser. No. 62/788,784 filed Jan. 5, 2019, and the subject matter thereof is incorporated herein by reference thereto.

TECHNICAL FIELD

An embodiment of the present invention relates generally to a computing system and more particularly to a computing system with an adaptive map pre-caching mechanism.

BACKGROUND

Modern consumer and industrial electronics, especially devices such as cellular phones, smart phones, tablet computers, laptops, vehicle integrated computing and communication systems, vehicle navigation systems, portable digital assistants, and combination devices, are providing increasing levels of functionality to support modern life including communication services. Research and development in the existing technologies can take a myriad of different directions.

Users of connected navigation systems (i.e. systems that use connectivity to provide navigation information like maps, Points of Interest (POIs), street names, directions, traffic conditions, etc.) often encounter areas of low or no connectivity during navigation. In such areas, users face the potential of interruption of services. For example, a navigation system may not be able to download map tiles to properly populate a map for a given area where there is no or low connectivity because of the lack of ability to communicate with a map fetching database to download map information. As a further example, a navigation system may not be able to provide route guidance due to the lack of ability to communicate with a map fetching database. Such interruptions can result in users getting lost, inability to communicate, or other inconveniences.

Thus, a need still remains for a computing system with an adaptive map pre-caching mechanism and method that pre-caches map information to prevent interruption of the navigation services in areas of no or low connectivity while driving. In view of the ever-increasing commercial competitive pressures, along with growing consumer expectations and the diminishing opportunities for meaningful product differentiation in the marketplace, it is increasingly critical that answers be found to these problems. Additionally, the need to improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF INVENTION

An embodiment of the present invention provides a method of operation of a computing system comprising: receiving a current location; determining a travel path based on the current location; determining a directionality along the travel path while in a free drive navigation mode; predicting a connectivity area based on the directionality; generating map information for a connectivity segment in the connectivity area with a low connectivity; and communicating the map information for storing onto a device for displaying when the connectivity segment is at a surrounding geographic adjacent area relative to the current location and while in the free drive navigation mode.

An embodiment of the present invention provides a computing system comprising: a control unit configured to: receive a current location; determine a travel path based on the current location; determine a directionality along the travel path while in a free drive navigation mode; predict a connectivity area based on the directionality; generate map information for a connectivity segment in the connectivity area with a low connectivity; a communication unit, coupled to the control unit, configured to: communicate the map information for storing onto a device for displaying when the connectivity segment is at a surrounding geographic adjacent area relative to the current location and while in the free drive navigation mode.

An embodiment of the present invention provides a non-transitory computer readable medium including instructions for a computing system comprising: receiving a current location; determining a travel path based on the current location; determining a directionality along the travel path while in a free drive navigation mode; predicting a connectivity area based on the directionality; generating map information for a connectivity segment in the connectivity area with a low connectivity; and communicating the map information for storing onto a device for displaying when the connectivity segment is at a surrounding geographic adjacent area relative to the current location and while in the free drive navigation mode.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
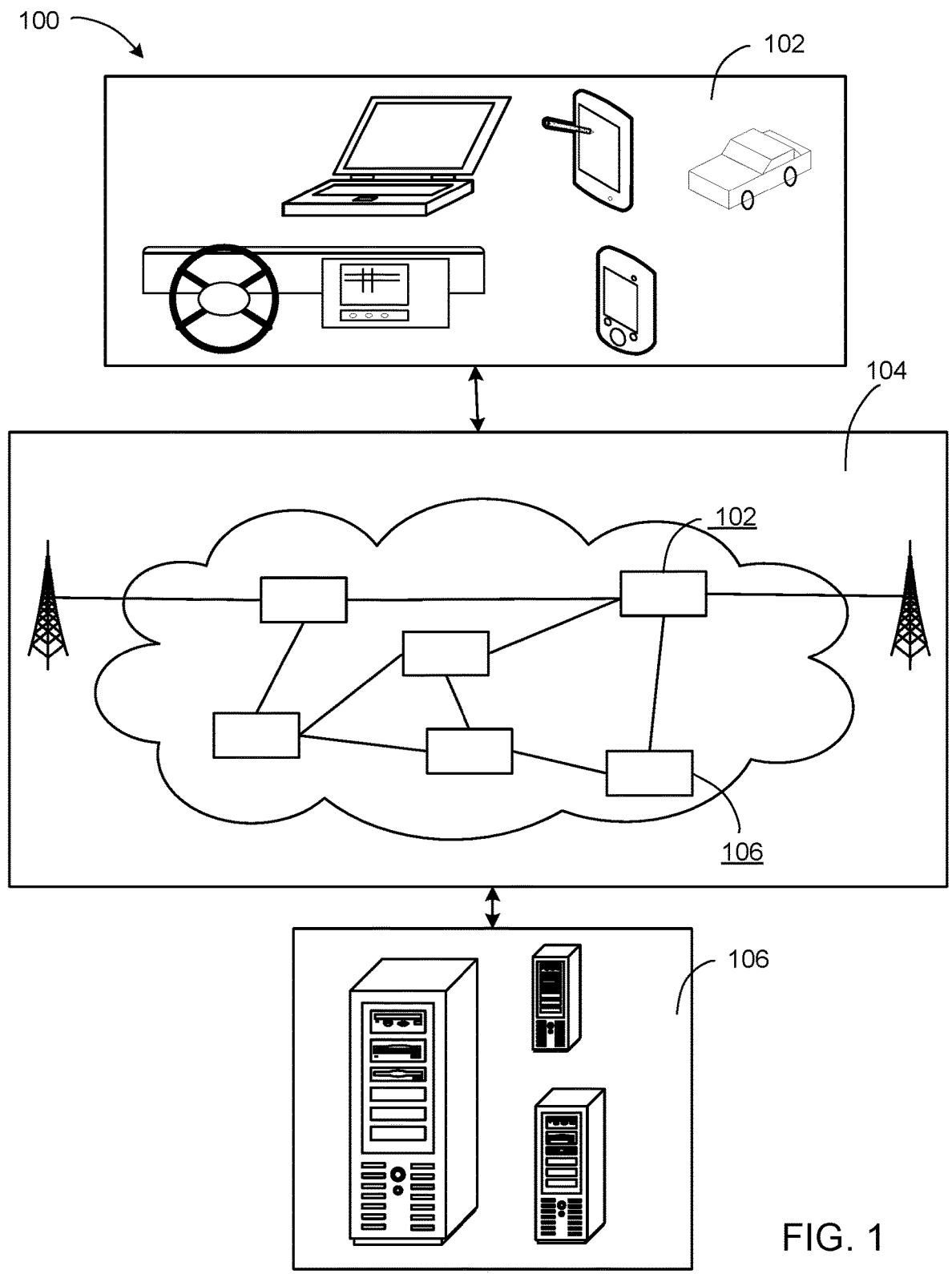
FIG. 1 is a computing system with an adaptive map pre-caching mechanism in an embodiment of the present invention.

Embodiments provide the computing system can minimize the potential of interruptions of navigation services by pre-caching map information. The adaptive map pre-caching mechanism provides for the display of the map information in areas of no or low connectivity to communicate with a map fetching database.

Embodiments provide the computing system can predict the areas of no or low connectivity by determining a directionality while driving on the travel path. The correct prediction of the areas of no or low connectivity provides the generation of map information for the computing system.

Embodiments provide the computing system can store the map information of the areas of no or low connectivity in the direction of the travel path. The stored map information can be displayed when the computing system is unable to communicate with a map fetching database. As an example, the computing system can display map information such as maps tiles, Points of Interest (POIs), street names, directions, traffic conditions, etc.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The embodiments have been numbered first embodiment, second embodiment, etc. as a matter of descriptive convenience and are not intended to have any other significance or provide limitations for an embodiment of the present invention. The terms first, second, etc. can be used throughout as part of element names and are used as a matter of descriptive convenience and are not intended to have any other significance or provide limitations for an embodiment.

The term "vehicle" referred to herein can include cars, self-driving cars, trains, buses, bicycles, boats, motorcycles, carts, airplanes, helicopters, or any other mode of transport, or a combination thereof in an embodiment of the present invention in accordance with the context in which the term is used.

The term "module" or "unit" referred to herein can include software, hardware, or a combination thereof in an embodiment of the present invention in accordance with the context in which the term is used. For example, the software can be machine code, firmware, embedded code, and application software. The software can also include a function, a call to a function, a code block, or a combination thereof. Also for example, the hardware can be circuitry, processor, a special purpose computer, integrated circuit, integrated circuit cores, a pressure sensor, an inertial sensor, a microelectromechanical system (MEMS), passive devices, or a combination thereof. Further, if a module is written in the system claims section below, the modules are deemed to include hardware circuitry for the purposes and the scope of system claims.

The modules in the following description of the embodiments can be coupled to one another as described or as shown. The coupling can be direct or indirect without or with, respectively, intervening items between coupled items. The coupling can be by physical contact or by communication between items.

Referring now to FIG. 1, therein is shown a navigation system 100 with an adaptive map pre-caching mechanism in an embodiment of the present invention. The navigation system 100 includes a first device 102, such as a client or a server, connected to a second device 106, such as a client or server. The first device 102 can communicate with the second device 106 along a communication path 104, such as a wireless or wired network.

For example, the first device 102 can be of any of a variety of devices, such as a smart phone, cellular phone, personal digital assistant, tablet computer, a notebook computer, laptop computer, desktop computer, vehicle embedded navigation system, or vehicle integrated communication system. The first device 102 can couple, either directly or indirectly, to the communication path 104 to communicate with the second device 106 or can be a stand-alone device. The first device 102 can be incorporated in a vehicle.

The second device 106 can be any of a variety of centralized or decentralized computing devices. For example, the second device 106 can be a laptop computer, a multimedia computer, a desktop computer, grid-computing resources, a virtualized computer resource, cloud computing resources, routers, switches, peer-to-peer distributed computing devices, a server, or a combination thereof. The second device 106 can be mounted externally or internally to a vehicle, centralized in a single room, distributed across different rooms, distributed across different geographical locations, embedded within a telecommunications network. The second device 106 can couple with the communication path 104 to communicate with the first device 102. The second device 106 can be incorporated in a vehicle.

For illustrative purposes, the navigation system 100 is shown with the first device 102 as a client device, although it is understood that the navigation system 100 can have the first device 102 as a different type of device. For example, the first device 102 can be a server. Also for illustrative purposes, the navigation system 100 is shown with the second device 106 as a server, although it is understood that the navigation system 100 can have the second device 106 as a different type of device. For example, the second device 106 can be a client device.

For brevity of description in the embodiments discussed below, the first device 102 will be described as a client device and the second device 106 will be described as a server device. The embodiments of the present invention, however, are not limited to this selection for the type of devices. The selection is an example of an embodiment of the present invention.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical communication, ultrasonic communication, or the combination thereof. For example, satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Cable, Ethernet, digital subscriber line (DSL), fiber optic lines, fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
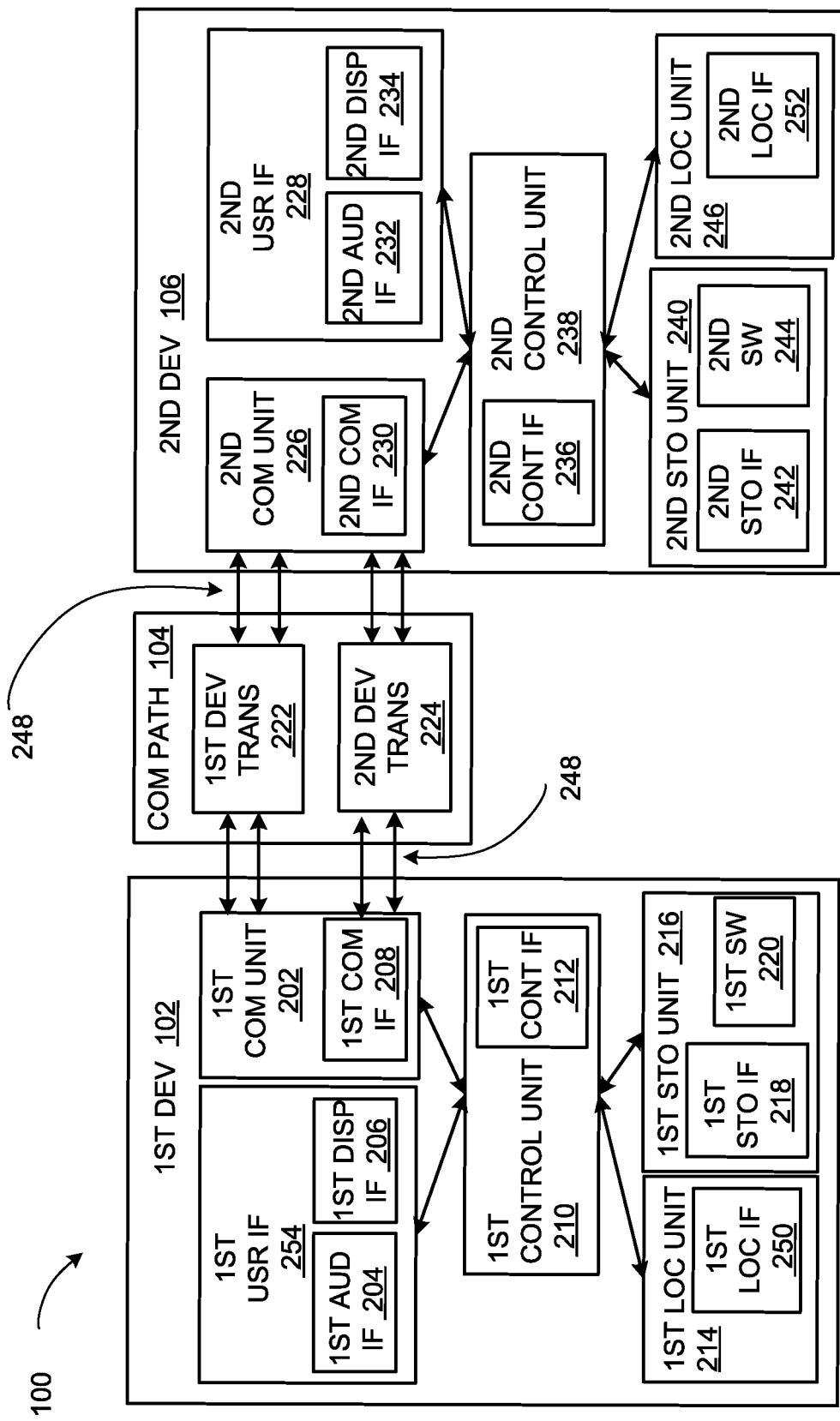
FIG. 2 is an exemplary block diagram of the components of the computing system.

Referring now to FIG. 2, therein is shown an exemplary block diagram of the components of the navigation system 100. The navigation system 100 can include the first device 102, the communication path 104, and the second device 106. The first device 102 can send information in a first device transmission 222 over the communication path 104 to the second device 106. The second device 106 can send information in a second device transmission 224 over the communication path 104 to the first device 102. The first device transmission 222 and the second device transmission 224 can be sent over one or more instance of the communication channel 248. The communication channel 248 refers either to a physical transmission medium such as a wire, or to a logical connection over a multiplexed medium such as a radio channel.

For illustrative purposes, the navigation system 100 is shown with the first device 102 as a client device, although it is understood that the navigation system 100 can have the first device 102 as a different type of device. For example, the first device 102 can be a server including a display interface.

Also for illustrative purposes, the navigation system 100 is shown with the second device 106 as a server, although it is understood that the navigation system 100 can have the second device 106 as a different type of device. For example, the second device 106 can be a client device.

Further, for illustrative purposes, the navigation system 100 is shown with interaction between the first device 102 and the second device 106, although it is understood that the first device 102 can similarly interact with another instance of the first device 102. Similarly, the second device 106 can similarly interact with another instance of the second device 106.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 210, a first storage unit 216, a first communication unit 202, a first user interface 254, and a first location unit 214. The first control unit 210 can include a first control interface 212. The first control unit 210 can execute a first software 220 to provide the intelligence of the navigation system 100.

The first control unit 210 can be implemented in a number of different ways. For example, the first control unit 210 can be a processor, an application specific integrated circuit (ASIC), an embedded processor, a microprocessor, a hardware control logic, a hardware finite state machine (FSM), a digital signal processor (DSP), or a combination thereof. The first control interface 212 can be used for communication between the first control unit 210 and other functional units in the first device 102. The first control interface 212 can also be used for communication that is external to the first device 102.

The first control interface 212 can receive information from the other functional units or circuits or from external sources, or can transmit information to the other functional units or circuits or to external destinations. The external sources and the external destinations refer to sources and destinations external to the first device 102.

The first control interface 212 can be implemented in different ways and can include different implementations depending on which functional units or circuits or external units or circuits are being interfaced with the first control interface 212. For example, the first control interface 212 can be implemented with a pressure sensor, an inertial sensor, a microelectromechanical system (MEMS), optical circuitry, waveguides, wireless circuitry, wireline circuitry, application programming interface, or a combination thereof.

The first storage unit 216 can store the first software 220. The first storage unit 216 can also store the relevant information, such as data representing incoming images, data representing previously presented image, sound files, or a combination thereof. For illustrative purposes, the first storage unit 216 is shown as a single element, although it is understood that the first storage unit 216 can be a distribution of storage elements.

Also for illustrative purposes, the navigation system 100 is shown with the first storage unit 216 as a single hierarchy storage system, although it is understood that the navigation system 100 can have the first storage unit 216 in a different configuration. For example, the first storage unit 216 can be formed with different storage technologies forming a memory hierarchal system including different levels of caching, main memory, rotating media, or off-line storage.

The first storage unit 216 can be a volatile memory, a nonvolatile memory, an internal memory, an external memory, or a combination thereof. For example, the first storage unit 216 can be a nonvolatile storage such as non-volatile random access memory (NVRAM), Flash memory, disk storage, or a volatile storage such as static random access memory (SRAM).

The first storage unit 216 can include a first storage interface 218. The first storage interface 218 can be used for communication between the first storage unit 216 and other functional units in the first device 102. The first storage interface 218 can also be used for communication that is external to the first device 102.

The first storage interface 218 can receive information from the other functional units or circuits or from external sources, or can transmit information to the other functional units or circuits or to external destinations. The external sources and the external destinations refer to sources and destinations external to the first device 102.

The first storage interface 218 can include different implementations depending on which functional units or circuits or external units or circuits are being interfaced with the first storage unit 216. The first storage interface 218 can be implemented with technologies and techniques similar to the implementation of the first control interface 212.

The first communication unit 202 can enable external communication to and from the first device 102. For example, the first communication unit 202 can permit the first device 102 to communicate with the second device 106, an attachment, such as a peripheral device or a computer desktop, and the communication path 104.

The first communication unit 202 can also function as a communication hub allowing the first device 102 to function as part of the communication path 104 and not be limited to be an end point or terminal unit to the communication path 104. The first communication unit 202 can include active and passive components, such as microelectronics or an antenna, for interaction with the communication path 104.

The first communication unit 202 can include a first communication interface 208. The first communication interface 208 can be used for communication between the first communication unit 202 and other functional units or circuits in the first device 102. The first communication interface 208 can receive information from the other functional units or circuits or from external sources, or can transmit information to the other functional units or circuits or to external destinations. The external sources and the external destinations refer to sources and destinations external to the first device 102.

The first communication interface 208 can include different implementations depending on which functional units or circuits are being interfaced with the first communication unit 202. The first communication interface 208 can be implemented with technologies and techniques similar to the implementation of the first control interface 212.

The first communication unit 202 can couple with the communication path 104 to send information to the second device 106 in the first device transmission 222. The second device 106 can receive information in a second communication unit 226 from the first device transmission 222 of the communication path 104.

The first control unit 210 can operate the first user interface 254 to present information generated by the navigation system 100. The first user interface 254, in one embodiment, allows a user of the navigation system 100 to interface with the first device 102. The first user interface 254 can include an input device and an output device. Examples of the input device of the first user interface 254 can include a keypad, a touchpad, soft-keys, a keyboard, a microphone, sensors for receiving remote signals, or any combination thereof to provide data and communication inputs. Examples of the output device can include a first display interface 206 and a first audio interface 204.

The first control unit 210 can operate the first user interface 254 to present information generated by the navigation system 100. The first control unit 210 can also execute the first software 220 for the other functions of the navigation system 100. The first control unit 210 can further execute the first software 220 for interaction with the communication path 104 via the first communication unit 202.

The first display interface 206 can be any graphical user interface such as a display, a projector, a video screen, or any combination thereof. The first audio interface 204 can include sensors, speakers, microphones, headphones, subwoofers, surround sound components, transducers, or any combination thereof. The first display interface 206 and the first audio interface 204 allow a user of the navigation system 100 to interact with the navigation system 100.

The first location unit 214 can generate location information, current heading, current acceleration, and current speed of the first device 102, as examples. The first location unit 214 can be implemented in many ways. For example, the first location unit 214 can function as at least a part of a global positioning system (GPS), and can include components, such as a GPS receiver, an inertial navigation system, a gyroscope, a cellular-tower location system, a pressure location system, or any combination thereof.

The first location unit 214 can include a first location interface 250. The first location interface 250 can be used for communication between the first location unit 214 and other functional units or circuits in the first device 102. The first location interface 250 can also be used for communication that is external to the first device 102.

The first location interface 250 can include different implementations depending on which functional units or circuits or external units or circuits are being interfaced with the first location unit 214. The first location interface 250 can be implemented with technologies and techniques similar to the implementation of the first control interface 212.

The second device 106 can be optimized for implementing an embodiment of the present invention in a multiple device embodiment with the first device 102. The second device 106 can provide additional or higher performance processing power compared to the first device 102. The second device 106 can include a second control unit 238, a second storage unit 240, a second communication unit 226, a second user interface 228, and a second location unit 246.

The second control unit 238 can execute a second software 244 to provide the intelligence of the second device 106 of the navigation system 100. The second software 244 can also operate independently or in conjunction with the first software 220. The second control unit 238 can provide additional performance compared to the first control unit 210.

The second control unit 238 can be implemented in a number of different ways. For example, the second control unit 238 can be a processor, an application specific integrated circuit (ASIC), an embedded processor, a microprocessor, a hardware control logic, a hardware finite state machine (FSM), a digital signal processor (DSP), or a combination thereof.

The second control unit 238 can include a second control interface 236. The second control interface 236 can be used for communication between the second control unit 238 and other functional units or circuits in the second device 106. The second control interface 236 can also be used for communication that is external to the second device 106. The second control interface 236 can receive information from the other functional units or circuits or from external sources, or can transmit information to the other functional units or circuits or to external destinations. The external sources and the external destinations refer to sources and destinations external to the second device 106.

The second control interface 236 can be implemented in different ways and can include different implementations depending on which functional units or circuits or external units are being interfaced with the second control interface 236. For example, the second control interface 236 can be implemented with a pressure sensor, an inertial sensor, a microelectromechanical system (MEMS), optical circuitry, waveguides, wireless circuitry, wireline circuitry, application programming interface, or a combination thereof.

The second storage unit 240 can store the second software 244. The second storage unit 240 can also store the information such as data representing incoming images, data representing previously presented image, sound files, or a combination thereof. The second storage unit 240 can be sized to provide the additional storage capacity to supplement the first storage unit 216.

For illustrative purposes, the second storage unit 240 is shown as a single element, although it is understood that the second storage unit 240 can be a distribution of storage elements. Also for illustrative purposes, the navigation system 100 is shown with the second storage unit 240 as a single hierarchy storage system, although it is understood that the navigation system 100 can have the second storage unit 240 in a different configuration. For example, the second storage unit 240 can be formed with different storage technologies forming a memory hierarchal system including different levels of caching, main memory, rotating media, or off-line storage.

The second storage unit 240 can be a volatile memory, a nonvolatile memory, an internal memory, an external memory, or a combination thereof. For example, the second storage unit 240 can be a nonvolatile storage such as non-volatile random access memory (NVRAM), Flash memory, disk storage, or a volatile storage such as static random access memory (SRAM).

The second storage unit 240 can include a second storage interface 242. The second storage interface 242 can be used for communication between the second storage unit 240 and other functional units or circuits in the second device 106. The second storage interface 242 can also be used for communication that is external to the second device 106.

The second storage interface 242 can receive information from the other functional units or circuits or from external sources, or can transmit information to the other functional units or circuits or to external destinations. The external sources and the external destinations refer to sources and destinations external to the second device 106.

The second storage interface 242 can include different implementations depending on which functional units or circuits or external units or circuits are being interfaced with the second storage unit 240. The second storage interface 242 can be implemented with technologies and techniques similar to the implementation of the second control interface 236.

The second communication unit 226 can enable external communication to and from the second device 106. For example, the second communication unit 226 can permit the second device 106 to communicate with the first device 102, an attachment, such as a peripheral device or a computer desktop, and the communication path 104.

The second communication unit 226 can also function as a communication hub allowing the second device 106 to function as part of the communication path 104 and not be limited to be an end point or terminal unit or circuit to the communication path 104. The second communication unit 226 can include active and passive components, such as microelectronics or an antenna, for interaction with the communication path 104.

The second communication unit 226 can include a second communication interface 230. The second communication interface 230 can be used for communication between the second communication unit 226 and other functional units in the second device 106. The second communication interface 230 can receive information from the other functional units or circuits or from external sources, or can transmit information to the other functional units or circuits or to external destinations. The external sources and the external destinations refer to sources and destinations external to the second device 106.

The second communication interface 230 can include different implementations depending on which functional units or circuits are being interfaced with the second communication unit 226. The second communication interface 230 can be implemented with technologies and techniques similar to the implementation of the second control interface 236.

The second communication unit 226 can couple with the communication path 104 to send information to the first device 102 in the second device transmission 224. The first device 102 can receive information in the first communication unit 202 from the second device transmission 224 of the communication path 104.

The second control unit 238 can operate the second user interface 228 to present information generated by the navigation system 100. The second user interface 228, in one embodiment, allows a user (not shown) of the navigation system 100 to interface with the second device 106. The second user interface 228 can include an input device and an output device. Examples of the input device of the second user interface 228 can include a keypad, a touchpad, softkeys, a keyboard, a microphone, sensors for receiving remote signals, or any combination thereof to provide data and communication inputs. Examples of the output device can include a second display interface 234 and a second audio interface 232.

The second control unit 238 can operate the second user interface 228 to present information generated by the navigation system 100. The second control unit 238 can also execute the second software 244 for the other functions of the navigation system 100. The second control unit 238 can further execute the second software 244 for interaction with the communication path 104 via the second communication unit 226.

The second display interface 234 can be any graphical user interface such as a display, a projector, a video screen, or any combination thereof. The second audio interface 232 can include sensors, speakers, microphones, headphones, subwoofers, surround sound components, transducers, or any combination thereof. The second display interface 234 and the second audio interface 232 allow a user of the navigation system 100 to interact with the navigation system 100.

The second location unit 246 can generate location information, current heading, current acceleration, and current speed of the second device 106, as examples. The second location unit 246 can be implemented in many ways. For example, the second location unit 246 can function as at least a part of a global positioning system (GPS) and can include components, such as a GPS receiver, an inertial navigation system, a cellular-tower location system, or any combination thereof.

The second location unit 246 can include a second location interface 252. The second location interface 252 can be used for communication between the second location unit 246 and other functional units or circuits in the second device 106. The second location interface 252 can also be used for communication that is external to the second device 106. The second location interface 252 can be implemented with technologies and techniques similar to the implementation of the second control interface 236.

Functionality of the navigation system 100 can be provided by the first control unit 210, the second control unit 238, or a combination thereof. For illustrative purposes, the second device 106 is shown with the partition having the second user interface 228, the second storage unit 240, the second control unit 238, the second location unit 246, and the second communication unit 226, although it is understood that the second device 106 can have a different partition. For example, the second software 244 can be partitioned differently such that some or all of its function can be in the second control unit 238 and the second communication unit 226. Also, the second device 106 can include other functional units not shown in FIG. 2 for clarity.

The first device 102 can have a similar or different partition as the second device 106. The functional units or circuits in the first device 102 can work individually and independently of the other functional units or circuits. The first device 102 can work individually and independently from the second device 106 and the communication path 104.

The functional units in the second device 106 can work individually and independently of the other functional units or circuits. The second device 106 can work individually and independently from the first device 102 and the communication path 104.

The functional units or circuits described above can be implemented in hardware. For example, one or more of the functional units or circuits can be implemented using a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

For illustrative purposes, the navigation system 100 is described by operation of the first device 102 and the second device 106. It is understood that the first device 102 and the second device 106 can operate any of the modules, units, and functions of the navigation system 100.

Figure 3:
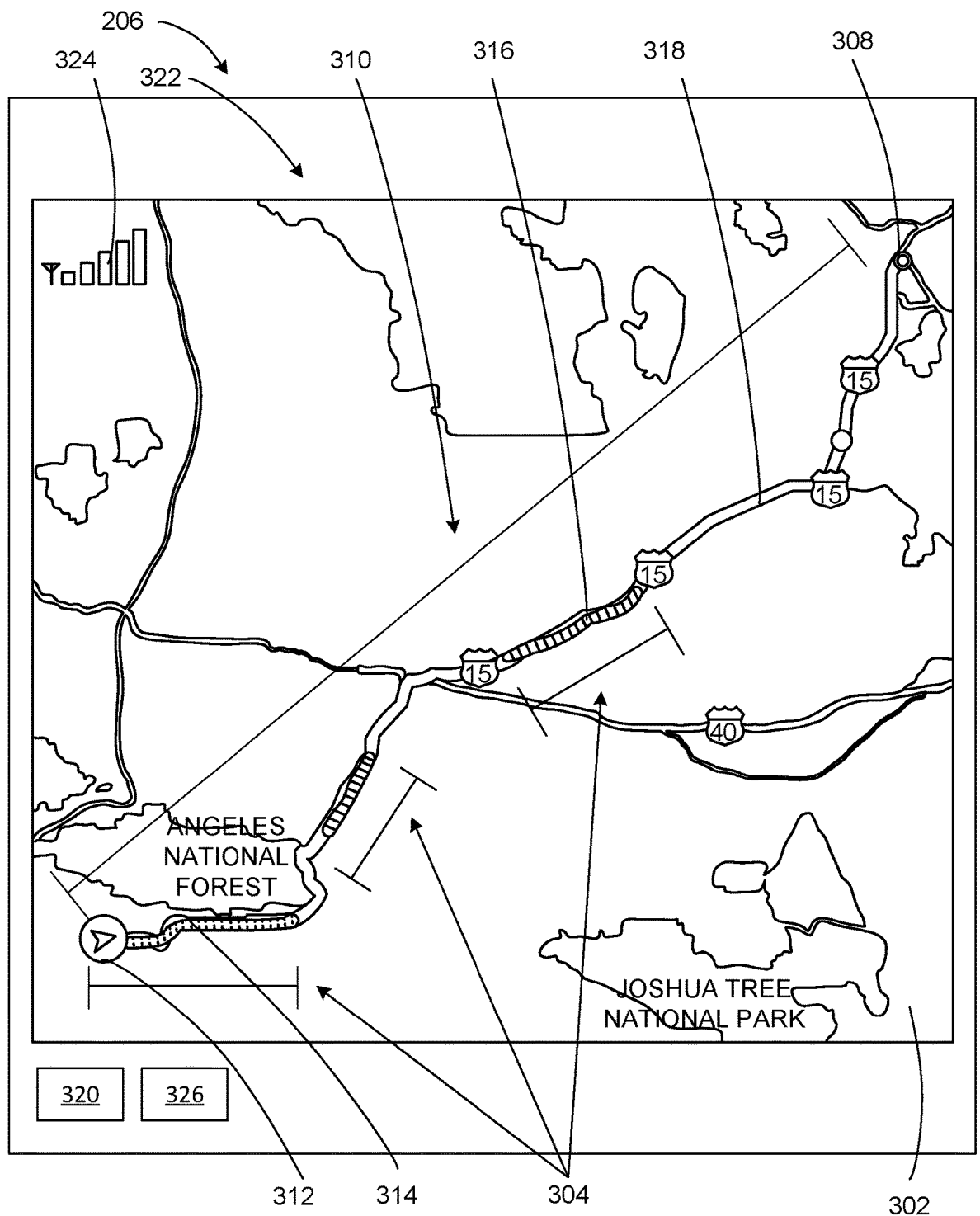
FIG. 3 is an exemplary display interface of the computing system when operating in an active navigation mode.

Referring now to FIG. 3, therein is shown an exemplary display interface of the navigation system 100 of FIG. 1 when the navigation system 100 is operating in an active navigation mode 302. The active navigation mode 302 refers to a mode of the navigation system 100 where the navigation system 100 calculates a route for the user to follow to reach a final geographic destination 308. For example, the active navigation mode 302 can provide instruction for guidance for a route for the user to follow. As a specific example, the guidance can include step-by-step instructions to traverse the route.

The final geographic destination 308 refers to a geographic location or point of interest that the user wants to navigate to. The final geographic destination 308 can include the end point or the termination of the route or the guidance. For example, the final geographic destination 308 can be a store, a landmark, an office building or site, a park, an address, a general geographic area, a street, a city or municipality, or a combination thereof. The aforementioned list is not meant to be limiting. As an example, a waypoint for the route can represent the final geographic destination 308 when the guidance is terminated at that particular instances of the waypoint.

For brevity of description, in this embodiment, reference to the first display interface 206 of FIG. 2 and the first user interface 254 of FIG. 2 is made, however, the descriptions with respect to the first display interface 206 and the first user interface 254 can be similarly applicable to the second display interface 234 of FIG. 2 and the second user interface 228 of FIG. 2.

In one embodiment, the first display interface 206, in conjunction with the first user interface 254, can enable a user of the navigation system 100 to input the final geographic destination 308 to enable the active navigation mode 302 of the navigation system 100. The user can input the final geographic destination 308 by using alpha-numeric characters, symbols, voice commands, gestures, or a combination thereof. For example, the user can input the final geographic destination 308 by interfacing with the first user interface 254. As a further example, the user can input the final geographic destination 308 by interfacing with the first audio interface 204 of FIG. 2, the second audio interface 232 of FIG. 2, or a combination thereof.

Continuing with the example, once the final geographic destination 308 is input by the user, the navigation system 100 can determine a travel route 310 for the user to navigate. The travel route 310 is the path to navigate from a current location 312 to the final geographic destination 308. For example, the travel route 310 can be determined based on closest distance to the final geographic destination 308, fastest time of arrival to the final geographic destination 308, avoidance of tolls to the final geographic destination 308, or other constraints.

The current location 312 is received by the first location unit 214 of FIG. 2, the second location unit 246 of FIG. 2, or a combination thereof. For example, the current location 312 can be determined by a global positioning system (GPS), cellular triangulation, wireless fidelity (WiFi) triangulation, dead reckoning, or a combination thereof.

The current location 312 can represent the starting point that determines the travel route 310 to the final geographic destination 308. The current location 312 can also represent the present location along the travel route 310 to the final geographic destination 308. The navigation system 100, the first device 102, the second device 106, or a combination thereof can track the current location 312 dynamically and in real time. The navigation system 100 tracking the current location 312 "dynamically" refers to the receiving, monitoring, or a combination there of the current location 312 that is non-static or by potentially differing mechanism as described earlier. The navigation system 100 tracking the current location 312 "real time" refers to the receiving, monitoring, or a combination thereof of the current location 312 at the time reading for the current location 312 is take regardless of the mechanism at some time period. The navigation system 100 can display the current location 312 on the first display interface 206.

Continuing with the example, the first display interface 206 can display the travel route 310 and any additional instances of the travel route 310 generated based on the different constraints. For example, the navigation system 100 can display the travel route 310 based on the shortest distance to the final geographic destination 308. As another example, the navigation system 100 can display the travel route 310 based on a fastest time of arrival to the final geographic destination 308. As a further example, the navigation system 100 can display the travel route 310 based on road constraints, such as avoid toll roads or avoid freeways.

The navigation system 100 can further display a connectivity segment 304 along the travel route 310 on the first display interface 206, the second display interface 234, or a combination thereof. The connectivity segment 304 refers a segment of a road, path, street, highway, freeway, route, or a combination thereof and includes information regarding the level of wireless communication connectivity for operation of the navigation system 100. The connectivity segment 304 can refer to a portion of the travel route 310 and the associated information regarding the level of wireless communication connectivity for operation of the navigation system 100. As a specific example, the connectivity segment 304 can include information regarding the level of wireless communication for the first device 102 of FIG. 1 to connect to, through, or a combination thereof the communication path 104 of FIG. 1, to connect to the second device 106, or a combination thereof.

For example, the connectivity segment 304 can be displayed on top of the travel route 310 with an overlay. As a further example, the connectivity segment 304 can be displayed adjacent to the travel route 310. The overlay can include annotation or information associated with the connectivity segment 304 and can be determined based on the strength of communication of wireless communication.

In one embodiment, the connectivity segment 304 can be determined by the navigation system 100 through communication with an external entity or external system. For example, the external entity or external system can provide information regarding strength of wireless communication connectivity in a geographic area. As a specific example, the navigation system 100 can obtain information regarding the strength of wireless communication connectivity in a geographic area from providers, such as OpenSignal, Inc. The navigation system 100 can communicate with an external entity or external system using the first communication unit 202 of FIG. 2, the second communication unit 226 of FIG. 2, or a combination thereof.

The navigation system 100 can use the information regarding the strength of wireless communication connectivity to generate the connectivity segment 304 along the travel route 310. The connectivity segment 304 can be represented using categorizations. The categorizations can indicate the level of wireless communication connectivity along the connectivity segment 304.

For example, the categorizations can be a high connectivity 314, a low connectivity 316, or a no connectivity 318 along an instance of the connectivity segment 304. The high connectivity 314 refers to a wireless communication connectivity that is above a predetermined threshold 320. The predetermined threshold 320 is the minimum level of wireless communication connectivity to request and receive map information 322. For example, the high connectivity 314 can represent the level of wireless communication connectivity to communicate with the second device 106, an external entity, an external system, or a combination thereof for a map fetching database, download map tiles, navigation guidance, information for point of interest, or a combination thereof.

The low connectivity 316 refers to a wireless communication connectivity that is below the predetermined threshold 320 but some wireless communication is detected or intermittent or non-stable for long periods above the predetermined threshold 320. For example, the low connectivity 316 can be the level of wireless communication connectivity that is insufficient to communicate with the second device 106, an external entity, an external system, or a combination thereof for a map fetching database, download map tiles, navigation guidance, information for point of interest, or a combination thereof in real time.

The no connectivity 318 refers to wireless communication connectivity that does not exist or cannot be detected. For example, the no connectivity 318 refers to the level of wireless communication connectivity that is unable to communicate with the second device 106, an external entity, an external system, or a combination thereof for a map fetching database, download map tiles, navigation guidance, information for point of interest, or a combination thereof.

In another embodiment, the connectivity segment 304 can be categorized using numeric categorizations, a set of numbers such as 1, 2, 3, indicating the level of wireless communication connectivity along the connectivity segment 304. Continuing with this example, 1 can represent the no connectivity 318, 2 can represent the low connectivity 316, and 3 can represent the high connectivity 314. The aforementioned are merely examples, and are not meant to be limiting and other forms of categorization are possible.

In another embodiment, the connectivity segment 304 can also have categorizations associated by other methods. For example, the connectivity segment 304 can be represented with indicators, such as colors, animation, patterns, or a combination thereof, to be displayed on the first display interface 206 along each of the connectivity segment 304. For example in one embodiment, the connectivity segment 304 determined with a categorization of the high connectivity 314 can be associated with the color red or shown in FIG. 3 as a dotted pattern, a categorization of the low connectivity 316 can be associated with the color blue or shown in FIG. 3 with dashed lines, and a categorization of the no connectivity 318 can be associated with color yellow or shown in FIG. 3 with no pattern within the segment, such that the first display interface 206 can display the different indicators for each of the connectivity segment 304 along the travel route 310. The indicators can be used to visually, audibly, or a combination thereof indicate a wireless communication connectivity of the connectivity segment 304.

Continuing with the example, once the navigation system 100 determines the travel route 310 and the connectivity segment 304 along the travel route 310, the navigation system 100 can request and receive the map information 322 for the connectivity segment 304 that have categorizations equivalent to the low connectivity 316 or the no connectivity 318. For example, the navigation system 100 can request and receive the map information 322 from a database, a repository, a digital library, or a combination thereof.

The map information 322 refers a diagram or a collection of data representing an arrangement or distribution of geographic features, physical features, non-physical features, or a combination thereof of the geographic location on a map. For example, the map information 322 can include a physical feature such as a path, a road sign, street name, an infrastructure, a geographical feature, a natural topology, points of interest, buildings, bodies of water, or a combination thereof. As a further example, the map information 322 can also include a non-physical feature such as a speed limit, a one-way designation, an address, points of interest (POI) or a combination thereof. The aforementioned list is not meant to be limiting.

The navigation system 100 can request and receive the map information 322 using the first communication unit 202, the second communication unit 226, or a combination thereof. The navigation system 100 can cache the map information 322 using the first storage unit 216 of FIG. 2, the second storage unit 240 of FIG. 2, an external database, or a combination thereof.

Wireless communication connectivity for the current location 312 can be detected from a sensor reading 324. The sensor reading 324 provides information for wireless communication connectivity for communication by the first communication unit 202, the second communication unit 226, or a combination thereof. The navigation system 100 can display the level of wireless communication connectivity based on the sensor reading 324 on the first display interface 206.

The sensor reading 324 can be utilized to detect a change 326 of the wireless communication connectivity at the current location 312. The change 326 is the detection of varying levels of the wireless communication connectivity. As an example, the change 326 can represent a difference of wireless communication connectivity from the low connectivity 316 to the high connectivity 314, the no connectivity 318 to the high connectivity 314, the high connectivity 314 to the low connectivity 316, the low connectivity 316 to the no connectivity 318, or a combination thereof.

Figure 4:
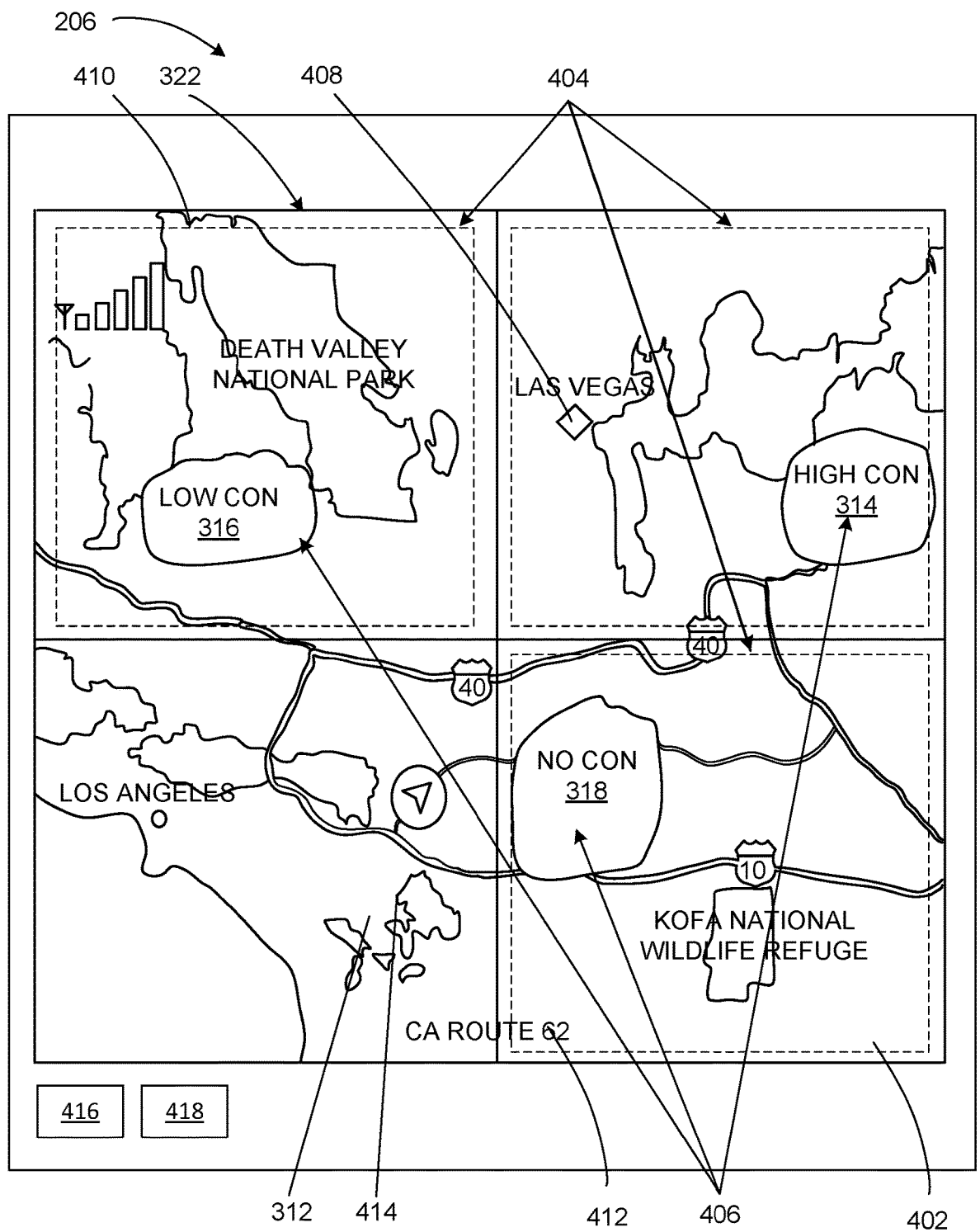
FIG. 4 is an exemplary display interface of the computing system when operating in a free drive navigation mode.

Referring now to FIG. 4, therein is an exemplary display interface of the navigation system 100 of FIG. 1 when operating in a free drive navigation mode 402. The free drive navigation mode 402 refers to a mode of the navigation system 100 where the navigation system 100 operates without input of the final geographic destination 308 of FIG. 3. The free drive navigation mode 402 operates when the navigation system 100 is not operating in the active navigation mode 302 of FIG. 3.

During operation in the free drive navigation mode 402, the navigation system 100 can be operating without a predetermined location for the final geographic destination 308. The navigation system 100, the first device 102 of FIG. 1, the second device 106, or a combination thereof can detect, send, receive, or a combination thereof the current location 312 while in the free drive navigation mode 402. The current location 312 can be updated dynamically and in real time. The navigation system 100 can track the current location 312 using the first location unit 214 of FIG. 2, the second location unit 246 of FIG. 2, or a combination thereof.

For brevity of description, in the embodiment described in FIG. 4, reference to the first display interface 206 of FIG. 2 and the first user interface 254 of FIG. 2 is made; however, similar to what was described with respect to FIG. 3, the descriptions with respect to the first display interface 206 and the first user interface 254 can be similarly applicable to the second display interface 234 of FIG. 2 and the second user interface 228 of FIG. 2.

In one embodiment of the navigation system 100 operating in the free drive navigation mode 402 shown in FIG. 4, the first display interface 206 can display the current location 312 as detected, received, or a combination thereof by the navigation system 100. The first display interface 206 can also display a historical travel information 408. The historical travel information 408 can include previously traveled to points of interest, saved points of interest, previously traveled routes, previous locations visited, or a combination thereof. The aforementioned list is not meant to be limiting.

The first display interface 206 can further display a surrounding geographic adjacent area 404. The surrounding geographic adjacent area 404 is the geographic areas adjacent to the current location 312. For example, the surrounding geographic adjacent area 404 can be an area to the north, northwest, northeast, south, southwest, southeast, west, east, or a combination thereof, of the current location 312. The surrounding geographic adjacent area 404 can be of varying size and can be based on a tile size 410.

The tile size 410 is the geometric unit for display of a portion of a map. For example, the tile size 410 can be a 20 kilometer by 20 kilometer square area to the north, northwest, northeast, south, southwest, southeast, west, east, or a combination thereof, of the current location 312. Also for example, the tile size 410 can be determined about the amount of information for the geographic region. As a specific example, the tile size 410 can be determined by a fix amount of information. With this specific example, the tile size 410 can cover a smaller geographic area for a metropolitan region while the tile size can cover a larger geographic area in comparison for a rural region based on the amount of information difference between the metropolitan region versus the rural region. Other sizes and geometric measurements can be used in other embodiments based on factors, such as vehicle speed, hardware, bandwidth, performance, and memory constraints of the navigation system 100.

Based on the current location 312, the navigation system 100 can determine a travel path 412. The travel path 412 is the specific road, path, street, highway, freeway, or route the user is traveling on. For example, the navigation system 100 can determine the travel path 412 as U.S. Highway 101 when the current location 312 is determined to be on U.S. Highway 101. As a further example, the navigation system 100 can determine the travel path 412 based on utilization of the historical travel information 408. The navigation system 100 can determine a directionality 414 based on the travel path 412.

The directionality 414 is the orientation that shows the direction of movement. The directionality 414 can be determined by calculating the change in the current location 312 or based on dead reckoning, such as with an accelerometer or a gyroscope in the first location unit 214, the second location unit 246, or a combination thereof. For example, the directionality 414 can be determined based on the change in degrees of latitude, longitude, or a combination thereof, of the current location 312.

As a further example, the directionality 414 can be determined as north, northwest, northeast, south, southwest, southeast, west, or east. As a specific example, the navigation system 100 can determine the directionality 414 based on attributes in the map information 322, such as road attributes as U.S. Highway 101 northbound, and based on the current location 312 being determined to be on the northbound lanes of U.S. Highway 101. The navigation system 100 can display the directionality 414 based on the current location 312 on the first display interface 206. For example, the directionality 414 can be displayed for the current location 312. Based on the directionality 414, the navigation system 100 can predict a connectivity area 406.

The connectivity area 406 is the surrounding geographic adjacent area 404 or a subset of that area with information regarding the wireless communication connectivity. For example, the connectivity area 406 can be determined by the navigation system 100 through communication with an external entity or external system, which can provide information regarding strength of the wireless communication connectivity in a geographic area. Also for example the connectivity area 406 can be similar be determine as for the connectivity segment 304 of FIG. 3. As a specific example, in one embodiment, the navigation system 100 can communicate using the first communication unit 202 of FIG. 2, the second communication unit 226 of FIG. 2, the first location unit 214 of FIG. 2, the second location unit 246 of FIG. 2, or a combination thereof, with a third party information provider, similar to what was described with respect to the connectivity segment 304 in FIG. 3 above. As a further example, the connectivity area 406 can be the surrounding geographic adjacent area 404 or a subset of that area in the directionality 414 of the travel path 412.

The connectivity area 406 can be represented using categorizations. The categorizations can indicate the strength of the wireless communication connectivity within the connectivity area 406. The connectivity area 406 can be categorized as the high connectivity 314, the low connectivity 316, or the no connectivity 318. The categorization of the connectivity area 406 can be displayed on the first display interface 206, similar to what was described with respect to the connectivity segment 304 in FIG. 3 above.

Continuing with the example, once the navigation system 100, the first device 102 of FIG. 1, the second device 106 of FIG. 1, or a combination thereof determines one or more of the surrounding geographic adjacent area 404 and the connectivity area 406, the navigation system 100, the first device 102, the second device 106, or a combination thereof can request and receive the map information 322 for the connectivity area 406 that have categorizations equivalent to the low connectivity 316 or the no connectivity 318. As an example, the navigation system 100 can request and receive the map information 322 from a database, a repository, a digital library, or a combination thereof.

The navigation system 100 can then use the information regarding the strength of wireless communication connectivity in the connectivity area 406 to generate the connectivity segment 304 of FIG. 3 relative to the current location 312. The navigation system 100 can display the connectivity segment 304 on the first display interface 206. The connectivity segment 304 can be represented using categorizations as discussed in FIG. 3.

The navigation system 100 can request and receive the map information 322 using the first communication unit 202 of FIG. 2, the second communication unit 226 of FIG. 2, or a combination thereof. The navigation system 100 can adjust a precache size 416 for the map information 322 in the connectivity area 406, the connectivity segment 304, or a combination thereof.

The precache size 416 is the amount of the map information 322 navigation system 100 to be requested for the connectivity area 406, the connectivity segment 304, or a combination thereof with the low connectivity 316 or the no connectivity 318. For example, the precache size 416 can be based on the tile size 410 for displaying on the first display interface 206. The precache size 416 will be relative to the connectivity area 406, the connectivity segment 304, or a combination thereof in the tile size 410.

As a further example, the precache size 416 can be based on a density 418 of the map information 322. The density 418 is the amount of the map information 322 within a geographic area. For example, the density 418 can be higher for a geographic area in a city. As a further example, the density 418 can be lower for a geographic area in an undeveloped area.

The navigation system 100 can cache the map information 322 based on the precache size 416 in the first storage unit 216, the second storage unit 240, or a combination thereof. The map information 322 cached in the first storage unit 216, the second storage unit 240, or a combination thereof can be displayed on the first display interface 206.

Figure 5:
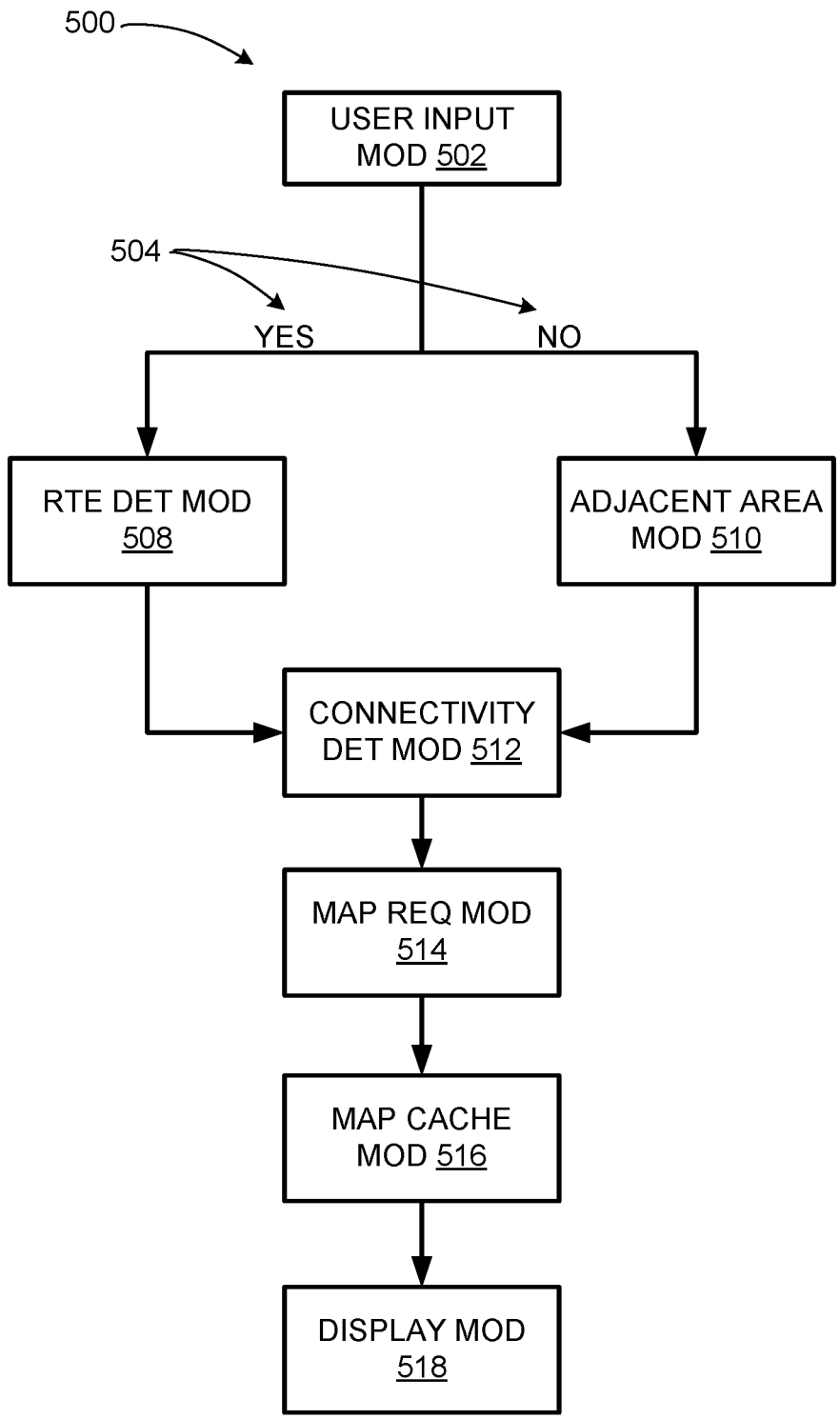
FIG. 5 is an exemplary control flow of the computing system.

Referring now to FIG. 5, therein is shown an exemplary control flow 500 of the navigation system 100. In one embodiment, the navigation system 100 can include a user input module 502, a route determination module 508, an adjacent area module 510, a connectivity determination module 512, a map request module 514, a map cache module 516, and a display module 518.

In one embodiment, the user input module 502 can be coupled to the route determination module 508 and the adjacent area module 510. The route determination module 508 can be coupled to the connectivity determination module 512. The adjacent area module 510 can be coupled to the connectivity determination module 512. The connectivity determination module 512 can be coupled to the map request module 514. The map request module 514 can be coupled to the map cache module 516. The map cache module 516 can be coupled to the display module 518.

The user input module 502 can enable the receiving of the final geographic destination 308 of FIG. 3 by the user of the navigation system 100, as described with respect to FIG. 3. The user input module 502 can detect whether the user of the navigation system 100 has input the final geographic destination 308 by interfacing with the first user interface 254 of FIG. 2, the second user interface 228 of FIG. 2, or a combination thereof.

The user input module 502 can set one or more of the flags 504 indicating that the user has input the final geographic destination 308. The flags 504 refer to a software or hardware mark, variable, condition, or a combination thereof that signals a particular condition or status.

For example, the user input module 502 can detect whether the user has input alpha-numeric characters or symbols indicating the final geographic destination 308 by interfacing with the first display interface 206 of FIG. 2, the second display interface 234 of FIG. 2, or a combination thereof. If alpha-numeric characters or symbols are detected and the final geographic destination 308 is verified, the user input module 502 can set one or more of the flags 504 to a value, for example "YES" or "1," to indicate that the final geographic destination 308 has been input by the user.

As a further example, the user input module 502 can detect whether the user has input voice commands indicating the final geographic destination 308 by interfacing with the first audio interface 204 of FIG. 2, the second audio interface 232 of FIG. 2, or a combination thereof. If the user input module 502 recognizes voice commands instructing the navigation system 100 to find the final geographic destination 308 and verifies the final geographic destination 308, the user input module 502 can set one or more of the flags 504 to a value, for example "YES or "1," to indicate that the final geographic destination 308 has been input by the user.

The user input module 502 can determine that the navigation system 100 will operate in the active navigation mode 302 of FIG. 3 if the user input module 502 sets one or more of the flags 504 to a value indicating that the final geographic destination 308 has been received. The navigation system 100 can pass control to the route determination module 506 when operating in the active navigation mode 302.

Alternatively, the user input module 502 can determine that the navigation system 100 will operate in the free drive navigation mode 402 of FIG. 4 if the user input module 502 sets one or more of the flags 504 to a value indicating that the final geographic destination 308 has not been received. The navigation system 100 can navigation system 100 pass control to the adjacent area module 510 when operating in the free drive navigation mode 402.

Continuing with the example, the user input module 502 can pass control to the route determination module 508 upon determining that the navigation system 100 is operating in the active navigation mode 302. The route determination module 508 can determine the travel route 310 of FIG. 3 to the final geographic destination 308, as described in FIG. 3. The determination of the travel route 310 can be done in any conventional manner known to a person of ordinary skill in the art, and in accordance to the description above with respect to FIG. 3. Once the route determination module 508 determines the travel route 310, control is passed to the connectivity determination module 512 to determine the connectivity segment 304 of FIG. 3 based on the travel route 310 generated.

Alternative, in another embodiment, the user input module 502 can pass control to the adjacent area module 510 upon determining that the navigation system 100 is operating in the free drive navigation mode 402. The adjacent area module 510 can determine the surrounding geographic adjacent area 404 of FIG. 4. As an example, the surrounding geographic adjacent area 404 can be determined as described in FIG. 4.

The adjacent area module 510 can determine the surrounding geographic adjacent area 404 by predicting where the user of the navigation system 100 is more likely to navigate or traverse to during the free drive navigation mode 402. The adjacent area module 510 can analyze one or more parameters to predict where the user might navigate to. For example, the one or more parameters can be based on the current location 312, the travel path 412, the directionality 414, the historical travel information 408, or a combination thereof. This lists are not meant to be limiting and other parameters can be used.

The adjacent area module 510 can use one or more statistical techniques to predict the surrounding geographic adjacent area 404 the user of the navigation system 100 is more likely to navigate to during the free drive navigation mode 402. The statistical techniques can include any known regression models or machine learning techniques. navigation system 100 Once the adjacent area module 510 determines the surrounding geographic adjacent area 404, control is passed to the connectivity determination module 512 to determine the connectivity area 406 based on the surrounding geographic adjacent area 404.

The connectivity determination module 512 can determine the wireless communication connectivity for the travel route 310 or the surrounding geographic adjacent area 404. The connectivity determination module 512 can also determine the connectivity segment 304 and the connectivity area 406 of FIG. 4, as described in FIGS. 3 and 4. The connectivity determination module 512 can communicate using the first communication unit 202 of FIG. 2, the second communication unit 226 of FIG. 2, or a combination thereof, with a third party information provider to obtain information regarding wireless communication connectivity along one or more segments of the travel route 310 or in the surrounding geographic adjacent area 404.

The connectivity determination module 512 can use the information obtained from the third party information provider in addition to the historical travel information 408 to determine the connectivity segment 304, the connectivity area 406, or a combination thereof. For example, in one embodiment, the connectivity determination module 512 can communicate with the third party information provider and request information regarding the wireless communication connectivity for the connectivity segment 304 along the travel route 310 generated by the route determination module 508. Once obtained, the connectivity determination module 512 can map the connectivity segment 304 to the travel route 310.

Once mapped the connectivity determination module 512 can categorize the connectivity segment 304 along the travel route 310 into the categorizations of the high connectivity 314, the low connectivity 316, or the no connectivity 318 along each segment of the travel route 310.

The navigation system 100 can generated map tiles to display the connectivity segment 304 to the user of the navigation system 100. For example, in one embodiment, map tiles can be generated which overlay the connectivity segment 304 along the travel route 310 which contain markers or graphics indicating the categorizations. For example the map tiles generated can include text indicating the connectivity segment 304 of the travel route 310. Such map tiles can include the text for the high connectivity 314, the low connectivity 316, or the no connectivity 318 for each of the connectivity segment 304.

Alternatively, in another embodiment, the map tiles generated can include colors and be overlaid over the connectivity segment 304 along the travel route 310. Such colors can indicate, for example, a red section indicating the connectivity segment 304 of the high connectivity 314, a blue section indicating the low connectivity 316, and a yellow section indicating the no connectivity 318. The aforementioned are merely examples, and not meant to be limiting. Other overlaying schemes can be used.

In another embodiment, the connectivity determination module 512 can similarly communicate with the third party information provider and request information regarding the wireless communication connectivity for the surrounding geographic adjacent area 404 generated by the adjacent area module 510.

Once obtained, the connectivity determination module 512 can map the connectivity area 406 to the surrounding geographic adjacent area 404 or subset of that area. Once mapped, the connectivity determination module 512 can categorize the connectivity area 406 into the categorizations of the high connectivity 314, the low connectivity 316, or the no connectivity 318 in the surrounding geographic adjacent area 404 or subset of that area.

Once categorized, map tiles can be generated to display the connectivity area 406 to the user of the navigation system 100. For example, in one embodiment, map tiles can be generated which overlay the connectivity area 406 in the surrounding geographic adjacent area 404 or a subset of that area, which contain markers or graphics indicating the categorizations. For example, the map tiles generated can include text indicating the wireless communication connectivity for the connectivity area 406 in the surrounding geographic adjacent area 404 or a subset of that area. Such map tiles can include the text of the high connectivity 314, the low connectivity 316, or the no connectivity 318 for the surrounding geographic adjacent area 404 or subset of that area.

Alternatively, in another embodiment, the map tiles generated can include colors and be overlaid for the connectivity area 406 in the surrounding geographic adjacent area 404 or a subset of that area. Such colors can indicate, for example, a red color indicating the connectivity area 406 of the high connectivity 314, a blue color indicating the low connectivity 316, and a yellow color indicating the no connectivity 318. The aforementioned are merely examples, and not meant to be limiting. Other overlaying schemes can be used.

In one embodiment, once the connectivity determination module 512 determines the connectivity segment 304, the connectivity area 406, or a combination thereof, control is passed to the map request module 514 to request and receive the map information 322 for the connectivity segment 304 or the connectivity area 406 categorized as the low connectivity 316 or the no connectivity 318.

The map request module 514 can request and receive the map information 322 for the connectivity segment 304 or the connectivity area 406 categorized as the low connectivity 316 or the no connectivity 318. The map request module 514 can further determine the precache size 416 for requesting and receiving the map information 322. The map request module 514 can determine the precache size 416 based on the tile size 410, the density 418, or a combination thereof.

The map request module 514 using the first control unit 210, the second control unit 238, or a combination thereof. The map request module 514 can request and receive the map information 322 based on the precache size 416 using the first communication unit 202, the second communication unit 226, or a combination thereof.

In one embodiment, the map request module 514 can request and receive the map information 322 based on the current location 312 of the user. For example, in one embodiment, the map request module 514 can use the first location unit 214, the second location unit 246, or a combination thereof to determine the current location 312. The map request module 514 can compare the current location 312 to the connectivity segment 304 or the connectivity area 406.

The map request module 514 can request and receive the map information 322 for the connectivity segment 304, the connectivity area 406, or a combination thereof categorized as the low connectivity 316 or the no connectivity 318 when the map request module 514 determines that the current location 312 is in the connectivity segment 304, the connectivity area 406, or a combination thereof categorized as the high connectivity 314. The map request module 514 can request and receive the map information 322 for the connectivity segment 304, the connectivity area 406, or a combination thereof categorized as the low connectivity 316 or the no connectivity 318 before the user navigates to those segments or areas.

In another embodiment, the map request module 514 can request and receive map information 322 when the sensor reading 324 detects the high connectivity 314. The map request module 514 can request and receive the map information 322 for the connectivity segment 304, the connectivity area 406, or a combination thereof categorized as the low connectivity 316 or the no connectivity 318 based on the sensor reading 324.

In another embodiment, the map request module 514 can further prioritize the request and receipt of the map information 322 of the connectivity segment 304, the connectivity area 406, or a combination thereof categorized as the low connectivity 316 or the no connectivity 318. For example, in one embodiment, the map request module 514 can generate a queue of the connectivity segment 304, the connectivity area 406, or a combination thereof categorized as the low connectivity 316 or the no connectivity 318 navigation system 100 based on the travel route 310 or the travel path 412.

As a further example, the navigation system 100 can request and receive the map information 322 for the connectivity segment 304, the connectivity area 406, or a combination thereof categorized as the low connectivity 316 or the no connectivity 318 based on the closest distance to the current location 312. Once the map request module 514 requests and receives the map information 322 control can be passed to the map cache module 516.

The map cache module 516 can cache the map information 322 obtained by the map request module 514. The map cache module 516 can cache the map information 322 in the first storage unit 216, the second storage unit 240, or a combination thereof.

The map cache module 516 can further remove the map information 322 previously cached. For example, the map cache module 516 can remove the map information 322 previously cached once the current location 312 is determined to be outside of the connectivity segment 304, the connectivity area 406, or a combination thereof. As a further example, the map cache module 516 can remove the map information 322 previously cached based on the change 326 of the sensor reading 324 to the high connectivity 314.

The map cache module 516 can communicate the change 326 to the first storage interface 218, the second storage interface 242, or a combination thereof to remove the map information 322. The navigation system 100 can remove the map information 322 for the connectivity segment 304, the connectivity area 406, or a combination thereof categorized as the low connectivity 316 or the no connectivity 318 from the first storage unit 216, the second storage unit 240, or a combination thereof. Once the map cache module 516 caches the map information 322 and removes the map information 322 previously cached, control can pass to the display module 518.

The display module 518 can display the map information 322 cached by the map cache module 516. The map information 322 can be displayed by the first display interface 206, the second display interface 234, or a combination thereof.

It has been discovered that the navigation system 100 with the adaptive map pre-caching mechanism allows users of the navigation system 100 greater efficiency and reliability during navigation because it allows the navigation system 100 to avoid being unable to retrieve the map information 322 during navigation along the connectivity segment 304 or the connectivity area 406 with the low connectivity 316 or the no connectivity 318.

It has been further discovered that the navigation system 100 with the adaptive map pre-caching mechanism promotes and provides greater safety for users of the navigation system 100 over conventional methods because it allows users to avoid getting lost in the connectivity segment 304 and the connectivity area 406 categorized as the low connectivity 316 or the no connectivity 318, because it allows the user to have access to the map information 322 that would otherwise not be available to be received by the navigation system 100 by proactively fetching the map information 322 before it is inaccessible.

It has been further discovered that the navigation system 100 with the adaptive map pre-caching mechanism allows the navigation system 100 greater efficiency and reliability during navigation because it allows the navigation system 100 to predict the connectivity area 406 based on the travel path 412 and the directionality 414.

It has been further discovered that the navigation system 100 with the adaptive map pre-caching mechanism allows the navigation system 100 greater efficiency and reliability by determining the precache size 416 for the map information 322 based on the density 418 of the map information 322 and the tile size 410 for displaying on the first device 102, the second device 106, or a combination thereof.

It has been further discovered that the navigation system 100 with the adaptive map pre-caching mechanism allows the navigation system 100 higher performance by communicating the change 326 of the connectivity segment 304, the connectivity area 406, or a combination thereof from the low connectivity 316 to the high connectivity 314 to remove the map information 322 previously cached.

The modules described in this application can be hardware implementation or hardware accelerators, including passive circuitry, activity circuitry, or both, in the first storage unit 216, the second storage unit 240, the first control unit 210, the second control unit 238, or a combination thereof. The module can also be hardware implementation or hardware accelerators, including passive circuitry, active circuitry, or both, within the first device 102, the second device 106, or a combination thereof but outside the first storage unit 216, the second storage unit 240, the first control unit 210, the second control unit 238, or a combination thereof.

The navigation system 100 has been described with module functions or order as an example. The navigation system 100 can partition the modules differently or order the modules differently. For example, the first software 220 of FIG. 2 of the first device 102 can include the modules for the navigation system 100. As a specific example, the first software 220 can include the user input module 502, the route determination module 508, the adjacent area module 510, the connectivity determination module 512, the map request module 514, the map cache module 516, and the display module 518, and associated sub-modules included therein.

The first control unit 210 of FIG. 2 can execute the first software 220 to operate the modules. For example, the first control unit 210 can implement the user input module 502, the route determination module 508, the adjacent area module 510, the connectivity determination module 512, the map request module 514, the map cache module 516, and the display module 518, and associated sub-modules included therein.

In another example of module partitions, the second software 244 of FIG. 2 of the second device 106 can include the modules for the navigation system 100. As a specific example, the second software 244 can include the user input module 502, the route determination module 508, the adjacent area module 510, the connectivity determination module 512, the map request module 514, the map cache module 516, and the display module 518, and associated sub-modules included therein.

The second control unit 238 of FIG. 2 can execute the second software 244 to operate the modules. For example, the second control unit 238 can implement the user input module 502, the route determination module 508, the adjacent area module 510, the connectivity determination module 512, the map request module 514, the map cache module 516, and the display module 518, and associated sub-modules included therein.

The navigation system 100 has been described with module functions or order as an example. The navigation system 100 can partition the modules differently or order the modules differently. For example, the various modules can be implemented in a different device, or the functionalities of the modules can be distributed across multiple devices. Also as an example, the various modules can be stored in a non-transitory memory medium.

The modules described in this application can be implemented as instructions stored on a non-transitory computer readable medium to be executed by the first control unit 210, the second control unit 238, or a combination thereof. The non-transitory computer readable medium can include the first storage unit 216, the second storage unit 240, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 6:
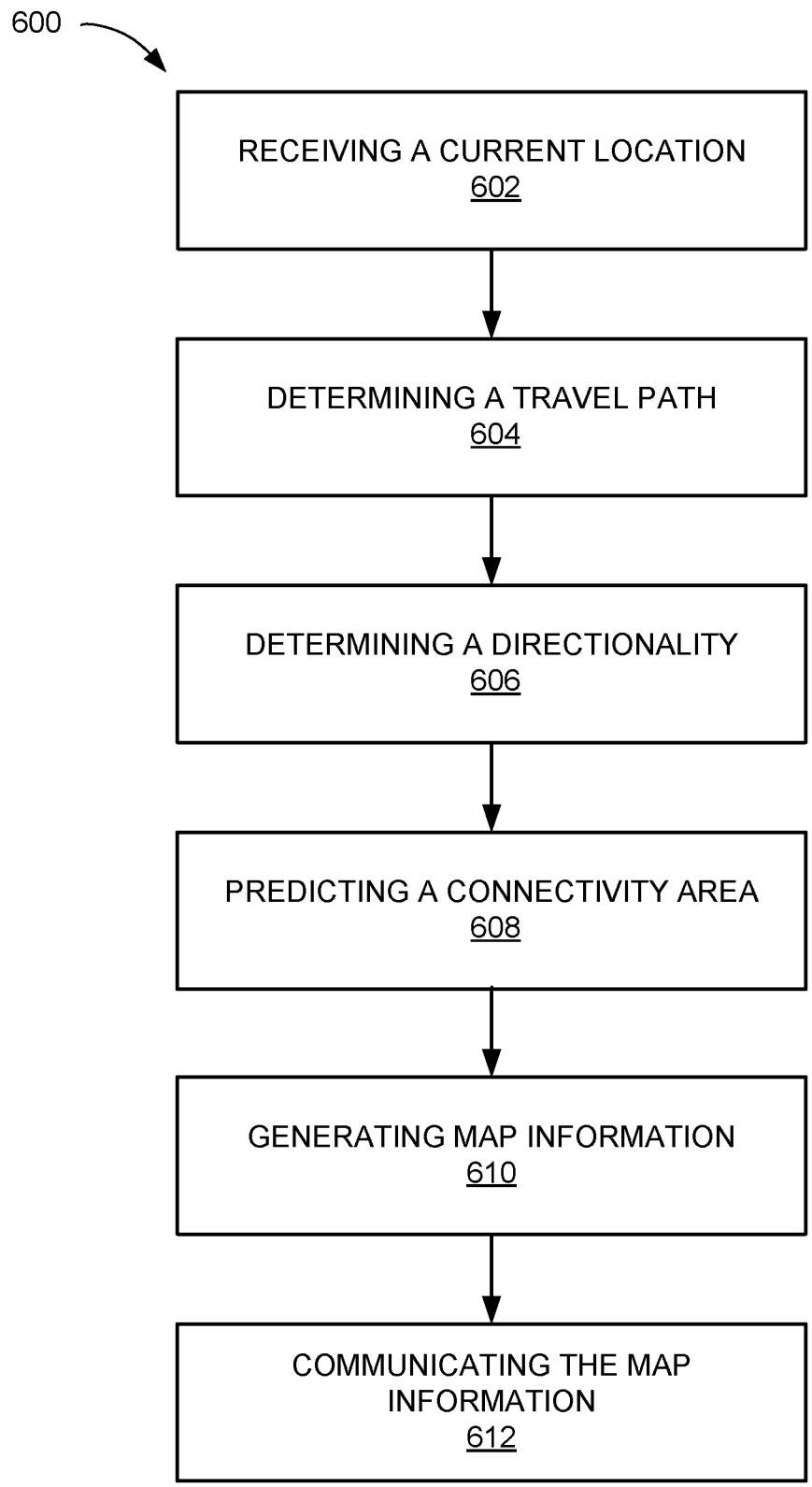
FIG. 6 is an exemplary flow chart of a method of operation of the computing system in a further embodiment of the present invention.

Referring now to FIG. 6, therein is shown an exemplary flow chart of a method 600 of operation of a navigation system 100 in a further embodiment of the present invention. The method 600 includes: receiving a current location in a box 602; determining a travel path based on the current location in a box 604; determining a directionality along the travel path while in a free drive navigation mode in a box 606; predicting a connectivity area based on the directionality in a box 608; generating map information for a connectivity segment in the connectivity area with a low connectivity in a box 610; and communicating the map information for storing onto a device for displaying when the connectivity segment is at a surrounding geographic adjacent area relative to the current location and while in the free drive navigation mode in a box 612.

The resulting method, process, apparatus, device, product, and system is cost-effective, highly versatile, and accurate, and can be implemented by adapting components for ready, efficient, and economical manufacturing, application, and utilization. Another important aspect of an embodiment of the present invention is that it valuably supports and services the historical trend of reducing costs, simplifying systems, and increasing performance.

These and other valuable aspects of the embodiments of the present invention consequently further the state of the technology to at least the next level. While the invention has been described in conjunction with a specific best mode, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a computing system comprising:
    determining operation in a free drive navigation mode without a final geographic destination;
    receiving a current location;
    determining a travel path based on the current location;
    determining a directionality along the travel path while in the free drive navigation mode;
    predicting a connectivity area in the directionality based on the travel path;
    generating a map information for a connectivity segment in the connectivity area with a low connectivity along the travel path including adjusting a precache size for the map information for a tile size based on a density of the map information for displaying on the device; and
    communicating the map information for storing onto a device for displaying when the connectivity segment is at a surrounding geographic adjacent area relative to the current location.

2. The method as claimed in claim 1 wherein predicting the connectivity area based on the directionality includes searching for the connectivity segment with the low connectivity in the surrounding geographic adjacent area along the directionality.

3. The method as claimed in claim 1 wherein predicting the connectivity area based on the directionality includes searching for the connectivity segment with the low connectivity based on a historical travel information along the directionality.

4. The method as claimed in claim 1 wherein generating the map information for storing onto a device include adjusting a precache size for the map information based on a density of the map information in the surrounding geographic adjacent area for the connectivity area, the connectivity segment, or a combination thereof.

5. The method as claimed in claim 1 further comprising:
    receiving a sensor reading when the current location is in the connectivity segment with the low connectivity; and
    updating the map information with the sensor reading.

6. The method as claimed in claim 1 further comprising:
    detecting a change of the connectivity area, the connectivity segment, or a combination thereof from the low connectivity to a high connectivity based on the current location; and communicating to the device of the change and the map information is eligible to be removed from the device.

7. A computing system comprising:
a control unit configured to:
  determine operation in a free drive navigation mode without a final geographic destination;
  receive a current location;
  determine a travel path based on the current location;
  determine a directionality along the travel path while in the free drive navigation mode;
  predict a connectivity area in the directionality based on the travel path;
  generate a map information for a connectivity segment in the connectivity area with a low connectivity along the travel path including adjusting a precache size for the map information for a tile size based on a density of the map information for displaying on the device; and
a communication unit, coupled to the control unit, configured to:
  communicate the map information for storing onto a device for displaying when the connectivity segment is at a surrounding geographic adjacent area relative to the current location.

8. The system as claimed in claim 7 wherein the control unit is further configured to search for the connectivity segment with the low connectivity in the surrounding geographic adjacent area along the directionality.

9. The system as claimed in claim 7 wherein the control unit is further configured to search for the connectivity segment with the low connectivity based on a historical travel information along the directionality.

10. The system as claimed in claim 7 wherein the control unit is further configured to adjust a precache size for the map information based on a density of the map information in the surrounding geographic adjacent area for the connectivity area, the connectivity segment, or a combination thereof.

11. The system as claimed in claim 7 wherein the control unit is further configured to:
  receive a sensor reading when the current location is in the connectivity segment with the low connectivity; and
  update the map information with the sensor reading.

12. The system as claimed in claim 7 wherein the control unit is further configured to:
  detect a change of the connectivity area, the connectivity segment, or a combination thereof from the low connectivity to a high connectivity based on the current location; and
  communicate to the device of the change and the map information is eligible to be removed from the device.

13. A non-transitory computer readable medium including instructions executable by a control unit for a computing system comprising:
  determining operation in a free drive navigation mode without a final geographic destination;
  receiving a current location;
  determining a travel path based on the current location;
  determining a directionality along the travel path while in the free drive navigation mode;
  predicting a connectivity area in the directionality based on the travel path;
  generating a map information for a connectivity segment in the connectivity area with a low connectivity along the travel path including adjusting a precache size for the map information for a tile size based on a density of the map information for displaying on the device; and
  communicating the map information for storing onto a device for displaying when the connectivity segment is at a surrounding geographic adjacent area relative to the current location.

14. The non-transitory computer readable medium as claimed in claim 13 further comprising searching for the connectivity segment with the low connectivity in the surrounding geographic adjacent area along the directionality.

15. The non-transitory computer readable medium as claimed in claim 13 further comprising searching for the connectivity segment with the low connectivity based on a historical travel information along the directionality.

16. The non-transitory computer readable medium as claimed in claim 13 further comprising adjusting a precache size for the map information based on a density of the map information in the surrounding geographic adjacent area for the connectivity area, the connectivity segment, or a combination thereof.

17. The non-transitory computer readable medium as claimed in claim 13 further comprising:
  receiving a sensor reading when the current location is in the connectivity segment with the low connectivity; and
  updating the map information with the sensor reading.

* * * * *